United States Patent [19]

Boudet et al.

[11] 4,266,451

[45] May 12, 1981

[54] AUTOMATIC DEVICE FOR SCREWING AND HANDLING BOLTS

[75] Inventors: Georges Boudet, Tours; Jean C. Desmoulins, Conflans Ste Honorine, both of France

[73] Assignee: SKF Compagnie d'Applications Mecaniques, France

[21] Appl. No.: 5,753

[22] Filed: Jan. 23, 1979

[51] Int. Cl.² .............................................. B25B 13/50
[52] U.S. Cl. .................................. 81/57.35; 81/57.41
[58] Field of Search ................. 81/57.24, 57.25, 57.35, 81/57.4, 57.41, 57.38

[56] References Cited

U.S. PATENT DOCUMENTS

| | | | |
|---|---|---|---|
| 1,447,744 | 3/1923 | Wright | 81/57.24 |
| 1,478,020 | 12/1923 | Butler | 81/57.24 |
| 2,582,442 | 1/1952 | Lapp | 81/57.4 |

*Primary Examiner*—James L. Jones, Jr.

*Attorney, Agent, or Firm*—Beveridge, DeGrandi, Kline & Lunsford

[57] ABSTRACT

Apparatus for screwing, unscrewing, and handling large bolts such as stud bolts for the cover of the core tank of a nuclear reactor. A circular guide rail is positioned above the periphery of the core tank. A main chassis is suspended from and movable along the guide rail. The main chassis includes two vertical beams and a plurality of horizontal guide beams which extend over the core tank periphery toward the interior thereof. A secondary chassis includes a number of bars which cooperate with the guide beams to permit horizontal movement of the secondary chassis in a direction substantially perpendicular to the direction of movement of the main chassis. A screwing mechanism is vertically movable on the secondary chassis and includes a gripping device for gripping the screw and a jack for compensating for the weight of the screw. A second gripping device can be included for gripping a washer.

11 Claims, 4 Drawing Figures

AUTOMATIC DEVICE FOR SCREWING AND HANDLING BOLTS

The present invention pertains to an automatic device for screwing, unscrewing, and handling of bolts, particularly large bolts such as stud bolts utilized to hold down the cover of the core tank of a nuclear reactor.

Core tank covers on nuclear reactors are generally held down by means of bolts which are large and heavy. Such bolts are located about the periphery of the core tank cover, which is usually circular. Preferably, the bolts are screwed down by automatic means in order to minimize the amount of time that is necessary for personnel to be in their vicinity, since in such location there is a hazard of exposure to dangerous radiation. It is also necessary to be able to move and handle these bolts during insertion before they are screwed down and, during withdrawal, after they are unscrewed to permit removal of the core tank cover.

The present invention is an apparatus automatically screwing, unscrewing, and handling such screws to permit their insertion and removal. The apparatus in accordance with the present invention is of a compact construction permitting movement about the core tank for successive operation on the several bolts thereof.

The apparatus in accordance with the present invention includes a main chassis in the form of a gantry which can be moved about the periphery of the core tank and is positioned between the upper edge of the core tank and a circular guide rail above that upper edge. The main chassis includes an assembly of horizontal guide beams. The apparatus further includes a secondary chassis having a number of bars which cooperate with the horizontal guide beams of the main chassis, permitting horizontal movement of the secondary chassis relative to the main chassis. A screwing mechanism can be moved vertically in relation to the secondary chassis, and a bolt gripping device is mounted on the secondary chassis for movement with the screwing mechanism.

In the preferred embodiment of the present invention the main chassis includes two vertical beams and a number of rollers permitting rolling of the main chassis about the periphery of the core tank. Support rollers on the main chassis bear against the upper surface of the circular guide rail. A first drive roller contacts the lower surface of the circular guide rail, and a second drive roller contacts the periphery of the core tank. These drive rollers permit moving of the main chassis in relation to the core tank.

Preferably, there are two support rollers which have their axis of rotation inclined to cooperate with an inclined flange of the circular guide rail. Also preferably, there are two locking rollers which contact the peripheral edge of the circular guide rail, opposite the support rollers. Consequently, the main chassis can be moved about the periphery of the core tank to move the entire apparatus thereabout for positioning adjacent each bolt to be screwed or unscrewed.

Likewise, in the preferred embodiment of the apparatus, chains on the main chassis horizontal guide beams are connected to rods on the secondary chassis so that movement of the chains results in horizontal movement of the secondary chassis relative to the main chassis. Accordingly, a bolt gripped by the bolt gripping device can be moved with the secondary chassis between a position over the threaded opening on the core tank and a position removed from the core tank for removal from the bolt gripping device and further handling.

Advantageously, the vertical movement of the screwing mechanism and the bolt gripping device is accomplished by a drive assembly fixed relative to the secondary chassis so that this vertical movement is relative to the secondary chassis.

If the bolt is provided with a washer, the apparatus of the present invention preferably includes a further gripping device for the washer, and this washer gripping device moves with the bolt gripping device and the screwing mechanism.

The present invention will be better understood from the following detailed description of a specific form of the apparatus, presented as a non-limiting example of a preferred embodiment adapted for the screwing, unscrewing, and handling of stud bolts for the cover of a core tank of a nuclear reactor, particularly when considered in conjunction with reference to the accompanying drawings in which.

Figure 1:
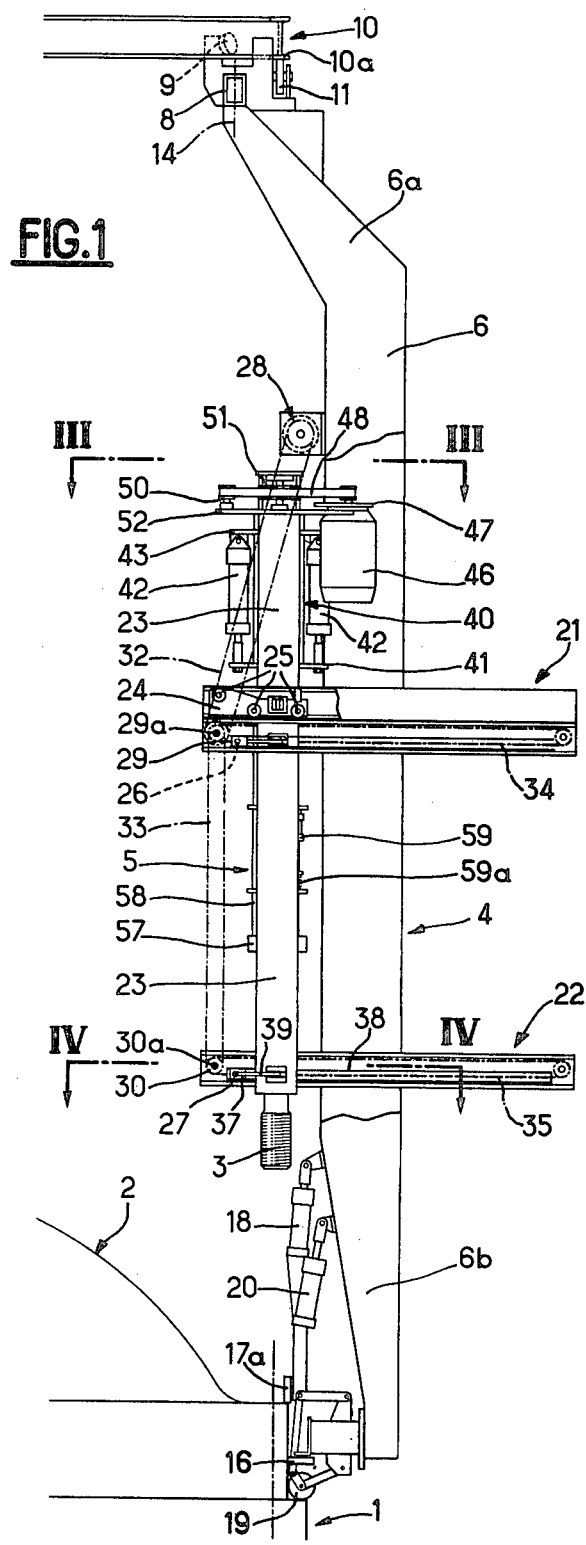
FIG. 1 is a fragmentary, diagrammatical illustration, partially in section, of a side elevational view of apparatus in accordance with the present invention.
Figure 2:
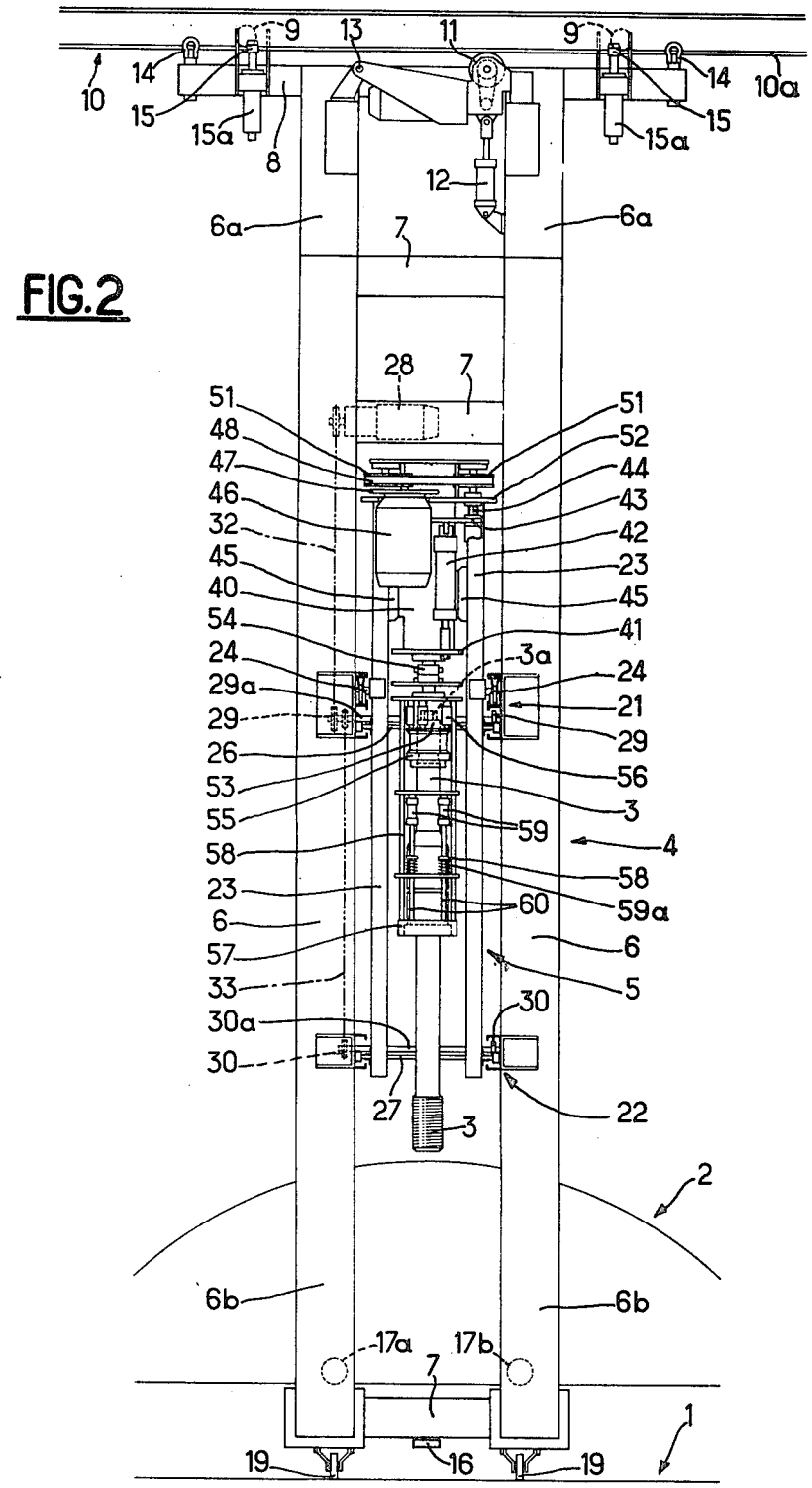
FIG. 2 is a diagrammatical illustration of an end elevational view of the apparatus of FIG. 1.

In the illustrative form of the present invention depicted in FIGS. 1 and 2, the bolt handling apparatus is mounted at the periphery of a core tank 1 of a nuclear reactor. Core tank 1 is provided with a cover 2 which is fastened to the core tank by means of a number of bolts such as bolt 3 which is adapted to threadedly engage an opening in core tank 1.

The apparatus includes a main chassis 4 and a secondary chassis 5. Main chassis 4 includes two vertical beams 6 which are held at the desired distance apart by spacers 7, with secondary chassis 5 positioned between the two beams 6. Each vertical beam 6 includes at its upper end a portion 6a which is inclined inwardly in relation to core tank 1 and its cover 2. A beam 8 extends horizontally at the end of inwardly inclined portions 6a. Two support rollers 9 are mounted from beam 8 with the axis of rotation of each support roller 9 inclined relative to horizontal so that each support roller 9 engages the inclined upper surface of the lower flange 10a of a circular guide rail 10 to roll thereon. Circular guide rail 10 is positioned above core tank 1 and has a diameter substantially equal to that of the circle defined by the axes of the several stud bolts of the cover 2 of core tank 1. As depicted in FIG. 2, preferably the two support rollers 9 are positioned adjacent the ends of horizontal beam 8 on either side of the pair of vertical beams 6.

A drive roller 11 is also mounted from beam 8 and is held against the lower surface of flange 10a by means of a jack assembly 12. Drive roller 11 is provided with a holding fork which can pivot about a pin 13. Two locking rollers 15 are mounted on horizontal beam 8, one on either side of main chassis 4. Locking rollers 15 cooperate with the external peripheral edge of the lower flange 10a of circular guide rail 10 opposite the two support rollers 9 to hold main chassis 4 in relation to the guide rail. Each locking roller 15 can be moved vertically by means of an associated jack 15a which has a resilient return permitting release of main chassis 4 from circular guide rail 10. The entire apparatus can be moved by means of handling hooks 14 at the two ends of horizontal beam 8.

A roller 16, having a vertical axis, is mounted at the lower ends 6b of vertical beams 6 to roll on the periphery of core tank 1. Two rollers 17a and 17b, having horizontal axes, are mounted at the lower ends 6b of the two vertical beams 6 to roll on the horizontal rim of cover 2. The two rollers 17a, 17b can be positioned vertically by means of jacks 18. One of these rollers, for example roller 17b, is driven in synchronism with upper drive roller 11, while the other is free-rolling.

A pair of rollers 19, having horizontal axes, are mounted from the lower ends of vertical beams 6 to roll vertically on the periphery of core tank 1 as the apparatus of the present invention is initially positioned about the core tank. Thus, as the apparatus is supported by handling hooks 14 and is lowered into position, vertical beams 6 are guided by rollers 19. When the apparatus is properly positioned on the core tank, rollers 19 are retracted to an inactive position by means of jacks 20, and rollers 16, 17a, and 17b then guide and drive the lower portion of the apparatus, cooperating with the periphery of core tank 1 and the horizontal rim of cover 2.

Two horizontal beams 21 are mounted on the two vertical beams 6, preferably at about the vertical midpoint of each vertical beam 6. The horizontal beams 21 are provided with double guide grooves on their facing sides. Two horizontal beams 22, each with a single guide groove, are mounted on the two vertical beams 6, parallel with and beneath beams 21. The vertical spacing between the beams 21 and the beams 22 is substantially the same as, or slightly less than, the length of the bolts 3. Horizontal beams 21 and 22 extend across the periphery of core tank 1 toward the interior thereof, passing within the circle defined by the threaded openings which receive bolts 3. Beams 21 and 22 likewise extend in the opposite direction beyond vertical beams 6.

Figure 3:
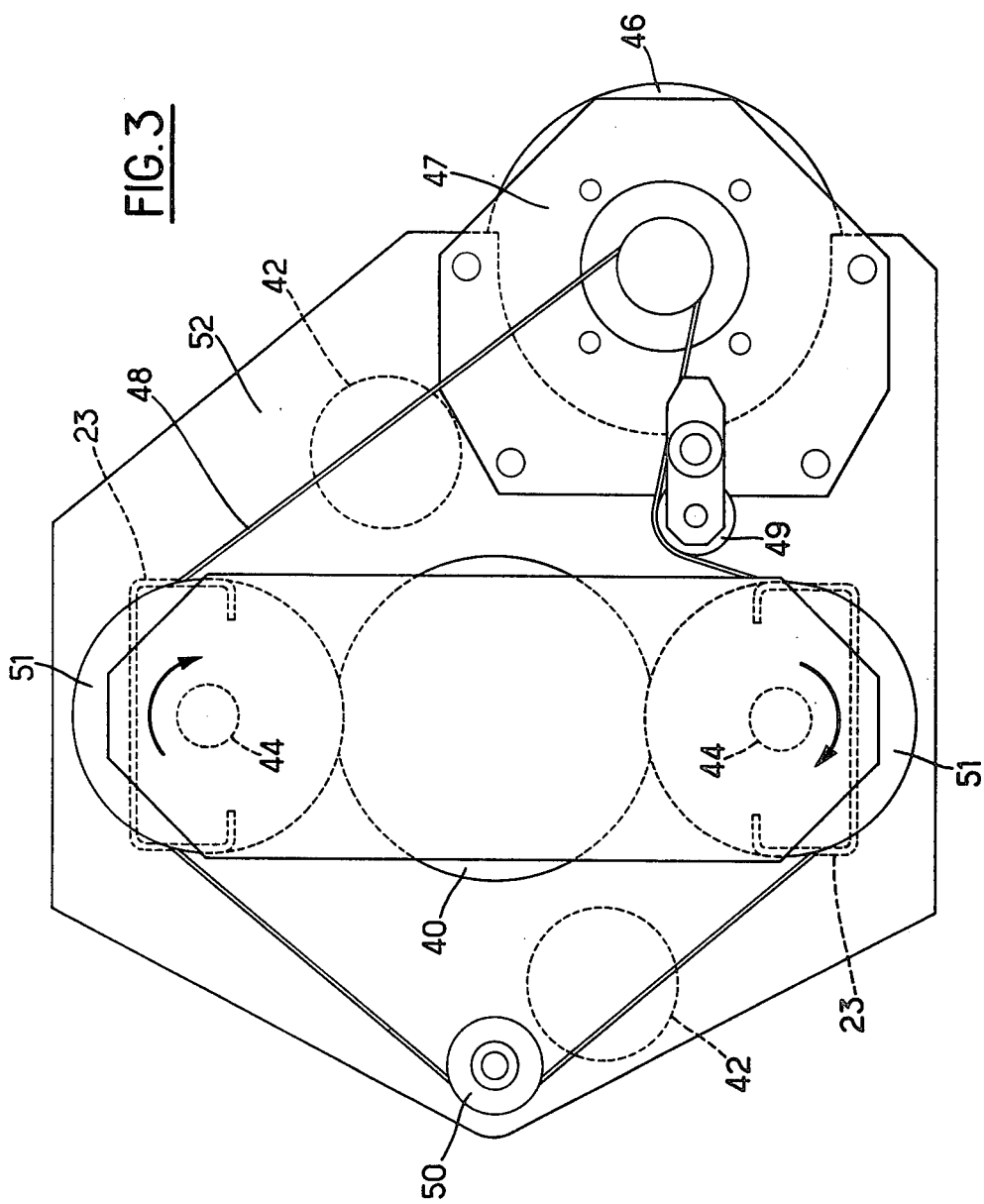
FIG. 3 is an enlarged fragmentary view taken along line III—III of FIG. 1.

Secondary chassis 5 includes two vertical beams 23, each of a U section as seen from FIG. 3. The lower ends of beams 23 are at approximately the level of lower horizontal beams 22, while the upper ends of beams 23 extend above upper horizontal beams 21. Vertical beams 23 are connected to support bars 24 which are provided with rollers 25 to roll on the flanges of one of the guide grooves of upper horizontal beam 21.

Figure 4:
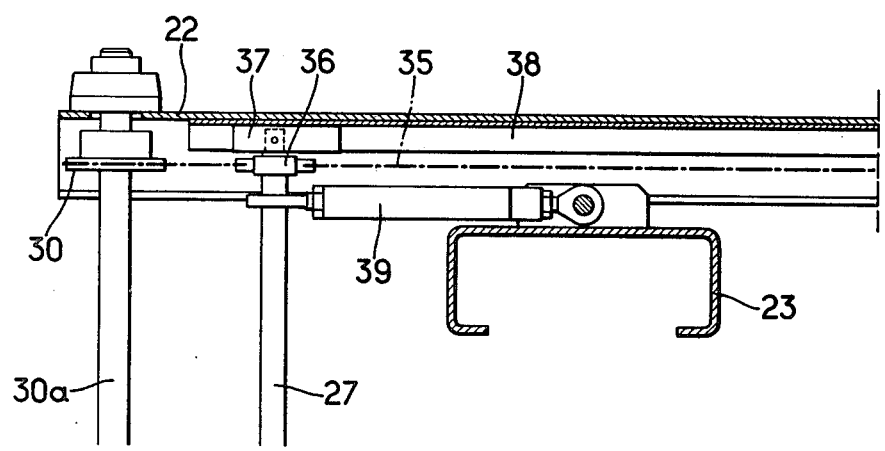
FIG. 4 is an enlarged fragmentary view taken along line IV—IV of FIG. 1.

A horizontal rod 26 connects the two vertical beams 23 at the height of upper horizontal beams 21, and a second horizontal rod 27 connects the two beams 23 at the height of lower horizontal beams 22. Drive motor 28 is mounted on main chassis 4. Sprocket 29 is mounted by shaft 29a to upper horizontal beam 21. Similarly, sprocket 30 is mounted by shaft 30a to lower horizontal beams 22. Chain 32 interconnects the sprocket of drive motor 28 with sprocket 29, and chain 33 interconnects sprockets 29 and 30. Horizontal chain 34 interconnects sprocket 29 with a sprocket at the second end of upper horizontal beam 21, while horizontal chain 35 interconnects sprocket 30 with a sprocket at the second end of lower horizontal beam 22. Consequently, activation of drive motor 28 causes movement of horizontal chains 34 and 35 about their sprockets. As depicted in FIG. 4, an intermediate element 36 is connected between two links of lower horizontal chain 35 and is connected to a guide shoe 37 which cooperates with a guide section 38 connected to lower horizontal beam 22. Intermediate element 36 is also connected to lower horizontal rod 27 which, in turn is connected by tie rod 39 to vertical beam 23 of secondary chassis 5. A similar set of the components depicted in FIG. 4 is provided at each side of secondary chassis 5 at each of the horizontal beams 21 and 22. Thus, as motor 28 operates, chains 34 and 35 move secondary chassis 5 horizontally relative to main chassis 4.

A screwing device 40 is supported by a horizontal plate 41 which, in turn, is supported by two jacks 42 that substantially compensate for the weight of bolt 3 during screwing and unscrewing thereof. The jacks 42 are connected to horizontal plate 43 which can be displayed vertically by means of two ball screws 44 positioned within the U sections of beams 23 on secondary chassis 5. Guide assemblies 45 are mounted on screwing device 40 and are equipped with rollers that cooperate with the U sections of beams 23 to stabilize screwing device 40.

As seen in FIGS. 1 and 3, a drive motor 46 is mounted on horizontal plate 47 of secondary chassis 5. Drive belt 48 passes about the pulley of drive motor 46, tension roller 49, guide roller 50, and the two pulleys 51 of the two ball screws 44. This entire structure is mounted on horizontal plate 52 of secondary chassis 5. Therefore, activation of drive motor 46 causes rotation of ball screws 44 and consequent raising or lowering of screwing device 40.

The head 53 of the screwing device is connected to the remainder of screwing device 40 by universal joint 54 and cooperates with the head 3a of bolt 3. Gripping device 55 also grips bolt 3, for example at a shoulder on the bolt. Gripping device 55 can be released by hydraulic jacks 56, three of which might be provided on secondary chassis 5.

A secondary gripping device 57 is mounted by vertical rods 58 on secondary chassis 5 for gripping of washers used with bolts 3. Gripping device 57 includes gripping claws which are actuated by control jacks 59 and rods 60 to grip the washers. Springs 59a ensure gripping of the washer.

To unscrew the stud bolts of the cover 2 of a core tank 1 on a nuclear reactor, the apparatus of the present invention is suspended by gripping hooks 14 and is brought to a position above the periphery of the core tank and is then lowered slowly until rollers 19 come into contact with the periphery of the core tank. Rollers 19 then permit the apparatus to be guided into its appropriate position, with upper support rollers 9 contacting lower flange 10a of circular guide rail 10. Locking rollers 15 are then positioned to contact the periphery of flange 10a. In this position the whole apparatus is balanced, with its cneter of gravity substantially in a vertical line with guide rail 10 due to the inclination of upper ends 6a of vertical beams 6. Upper drive roller 11 is positioned against lower flange 10a by means of jack 12. Rollers 19 are retracted by jacks 20, and rollers 16, 17a, and 17b are brought into contact with the periphery of core tank 1 and the rim of cover 2.

The apparatus is then moved by means of drive rollers 11 and 17b to the position of one of the bolts 3. This positioning can be more precisely accomplished by use of electro-optical guide means. Drive motor 28 is activated to move secondary chassis 5 so that screwing device 40 is over the axis of bolt 3. Drive motor 46 is then activated to lower screwing device 40 until gripping device 55 is able to grip the bolt. Jacks 56 and 59 are actuated, as required, to causing gripping devices 55 and 57 to grip the bolt and washer, if any. Screwing device 40 is then rotated to unscrew the bolt from the threaded opening. Jacks 42 support screwing device 40 and gripping devices 55 and 57 to facilitate the unscrewing.

Once bolt 3 is unscrewed from its threaded opening, drive motor 46 is activated to raise the screwing device and the bolt. When the screwing device is at its upper position, as depicted in FIGS. 1 and 2, drive motor 28 is activated to move secondary chassis along horizontal beams 21 and 22 to its outer position in which bolt 3, suspended from gripping device 55, is clear of core tank 1. Bolt 3 can then be deposited in a suitable receptacle.

As is readily apparent, the screwing operation takes place in similar, but opposite, manner.

The apparatus of the present invention, thus, permits the screwing, unscrewing, and handling of bolts of large size and great weight, such as bolts used in fastening the core tank covers of nuclear reactors, in an automatic manner. The operator can supervise these various operations, for example, by means of a control camera while remaining outside regions subject to dangerous radiation. Although the present invention has been described with reference to a preferred embodiment, modifications and rearrangements could be made within the scope of the invention.

What is claimed is:

1. Apparatus for automatic screwing and handling of bolts comprising:
    a horizontally mounted guide rail;
    a main chassis suspended from said guide rail and including first drive means for moving said main chassis horizontally along said guide rail;
    a secondary chassis movably mounted on said main chassis and including second drive means for moving said secondary chassis horizontally relative to said main chassis and at substantially a right angle with respect to the direction of movement of said main chassis along said guide rail; and
    a screwing mechanism movably mounted on said secondary chassis and including a first gripping device for gripping a bolt, third drive means for moving said first gripping device vertically relative to said main chassis, and means for rotating said first gripping device about its vertical axis.

2. Apparatus as claimed in claim 1 in which said guide rail is a substantially circular guide rail and is positioned above the periphery of a core tank of a nuclear reactor for movement of the apparatus therearound.

3. Apparatus as claimed in claim 2 in which said main chassis includes first and second vertical beams, each vertical beam having an upper end portion inclined inwardly toward the center of the core tank to position the center of gravity of the apparatus in substantially a vertical line with said guide rail during screwing and unscrewing operations.

4. Apparatus as claimed in claim 2 in which said main chassis includes first and second vertical beams, first roller means connected to the upper ends of said vertical beams and supporting said main chassis from said guide rail and second roller means connected to the lower ends of said vertical beams and adapted to contact the periphery of a core tank, at least one of said first roller means and said second roller means including a drive roller for driving said main chassis about the periphery of the core tank.

5. Apparatus as claimed in claim 4 in which said guide rail includes a horizontally mounted flange having an inclined upper surface and in which said first roller means includes at least one roller having an inclined axis of rotation permitting said roller to cooperate with said inclined upper surface.

6. Apparatus as claimed in claim 4 in which said first roller means includes a first roller positioned on a first surface of said guide rail and a second roller positioned on a second surface of said guide rail and cooperating with said guide rail to retain said main chassis thereon.

7. Apparatus as claimed in claim 1 in which said main chassis includes a plurality of horizontal guide beams and said secondary chassis includes a plurality of bars which cooperate with said horizontal guide beams to guide said secondary chassis during horizontal movement thereof relative to said main chassis.

8. Apparatus as claimed in claim 7 in which said second drive means includes a chain extending within said horizontal guide beams, a rod connected to said secondary chassis and said chain, and means for driving said chain horizontally along said horizontal guide beams.

9. Apparatus as claimed in claim 1 in which said third drive means comprises a plurality of ball screws threadedly engaging said secondary chassis and means for rotating said ball screws.

10. Apparatus as claimed in claim 1 in which said screwing mechanism further includes jack means coupled to said first gripping device for substantially compensating for the weight of the bolt.

11. Apparatus as claimed in claim 1 in which said screwing mechanism further includes a second gripping device vertically movable with said first gripping device for gripping a washer disposed on the bolt.

* * * * *